United States Patent
Hallapuro et al.

(10) Patent No.: US 7,349,473 B2
(45) Date of Patent: Mar. 25, 2008

(54) METHOD AND SYSTEM FOR SELECTING INTERPOLATION FILTER TYPE IN VIDEO CODING

(75) Inventors: Antti Hallapuro, Tampere (FI); Jani Lainema, Irving, TX (US); Martz Karczewicz, Irving, TX (US)

(73) Assignee: Nokia Corporation, Espoo (FI)

( * ) Notice: Subject to any disclaimer, the term of this patent is extended or adjusted under 35 U.S.C. 154(b) by 747 days.

(21) Appl. No.: 10/616,894

(22) Filed: Jul. 9, 2003

(65) Prior Publication Data
US 2004/0062307 A1   Apr. 1, 2004

Related U.S. Application Data

(60) Provisional application No. 60/395,111, filed on Jul. 9, 2002.

(51) Int. Cl.
  *H04B 1/66* (2006.01)
(52) U.S. Cl. .................. 375/240.12; 375/240.15; 375/240.16; 375/240.25; 375/240.17; 375/240.14; 382/238; 382/236; 382/235; 382/239; 348/699
(58) Field of Classification Search .......... 375/240.12, 375/240.15, 240.17, 240.16, 240.14, 240.25; 382/238, 239, 236, 235; 348/699
See application file for complete search history.

(56) References Cited

U.S. PATENT DOCUMENTS

| 4,771,331 A | 9/1988 | Bierling et al. ............. 358/136 |
| 5,541,660 A | 7/1996 | Kim et al. ................... 358/416 |
| 2004/0076333 A1* | 4/2004 | Zhang et al. ............... 382/238 |

FOREIGN PATENT DOCUMENTS

JP   09 322175 A   12/1997

OTHER PUBLICATIONS

IEEE ICIP 0-7803-7622-Jun. 2002; T. Wedi; "Adaptive Interpolation Filter for Motion Compensated Prediction"; pp. II.509-II.512; 2002.
Joint Video Team of ISE/IE MPEG & ITU-T VCEG, JVT-C052; K. Sato et al.; "Adaptive MC Interpolation Filter for Complexity Reduction"; pp. 1-6; 2002.
Joint Video Team of ISE/IE MPEG & ITU-T VCEG, JVT-C040; K. Chono et al.; "Adaptive Motion Interpolation on MB Basis"; pp. 1-21; 2002.
Proceedings of SPIE vol. 4472, SPIE 0277-786X/01; P. Topiwala et al.; "Overview and Performance Evaluation of the ITU-T Draft H.26L Video Coding Standard"; pp. 290-306; 2001.
Joint Video Team (JVT) of ISO/IEC MPEG and ITU-T VCEG; T. Wiegand; "Joint Committee Draft (CD) of Joint Video Specification ITU-T rec. H. 264 ISO/IEC 14496-10 AVC JVT-C167"; May 2002.

* cited by examiner

*Primary Examiner*—Shawn S. An
(74) *Attorney, Agent, or Firm*—Ware, Fressola, Van Der Sluys & Adolphson, LLP

(57) ABSTRACT

A method and system for coding a video sequence based on motion compensated prediction, wherein an interpolation filter is used to generate predicted pixel values for picture blocks in the video sequence. The interpolation filter for use in conjunction with a multi-picture type is shorter or having fewer coefficients than the interpolation filter for use in conjunction with a single-picture type. As such, the complexity of the interpolation filter for the multi-picture type can be reduced. Furthermore, the interpolation filter may be changed based on the characteristics of the block, the size and/or the shape of the block.

32 Claims, 7 Drawing Sheets

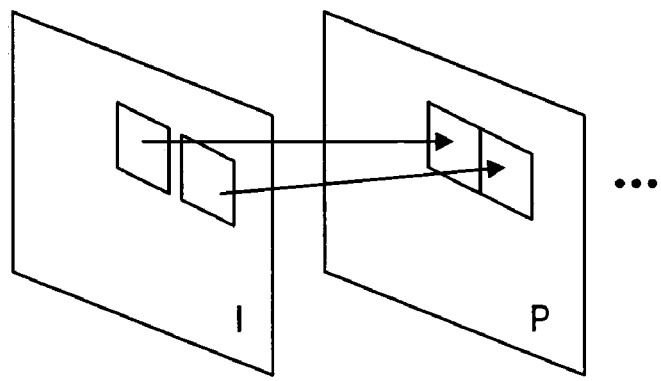
Fig. 1A
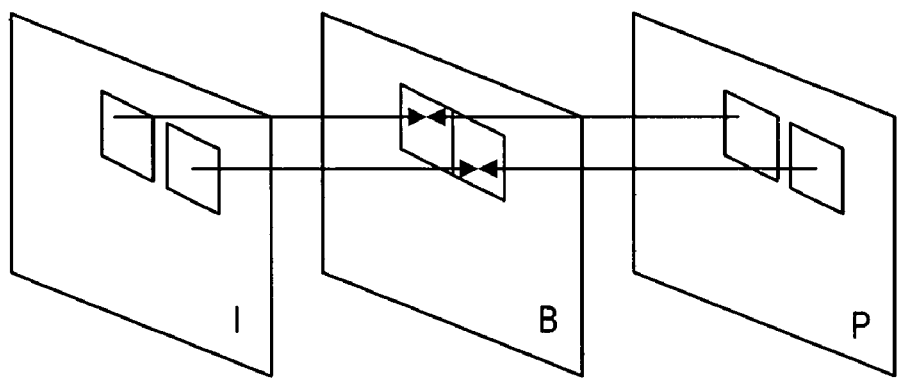
Fig. 1B
Fig. 2

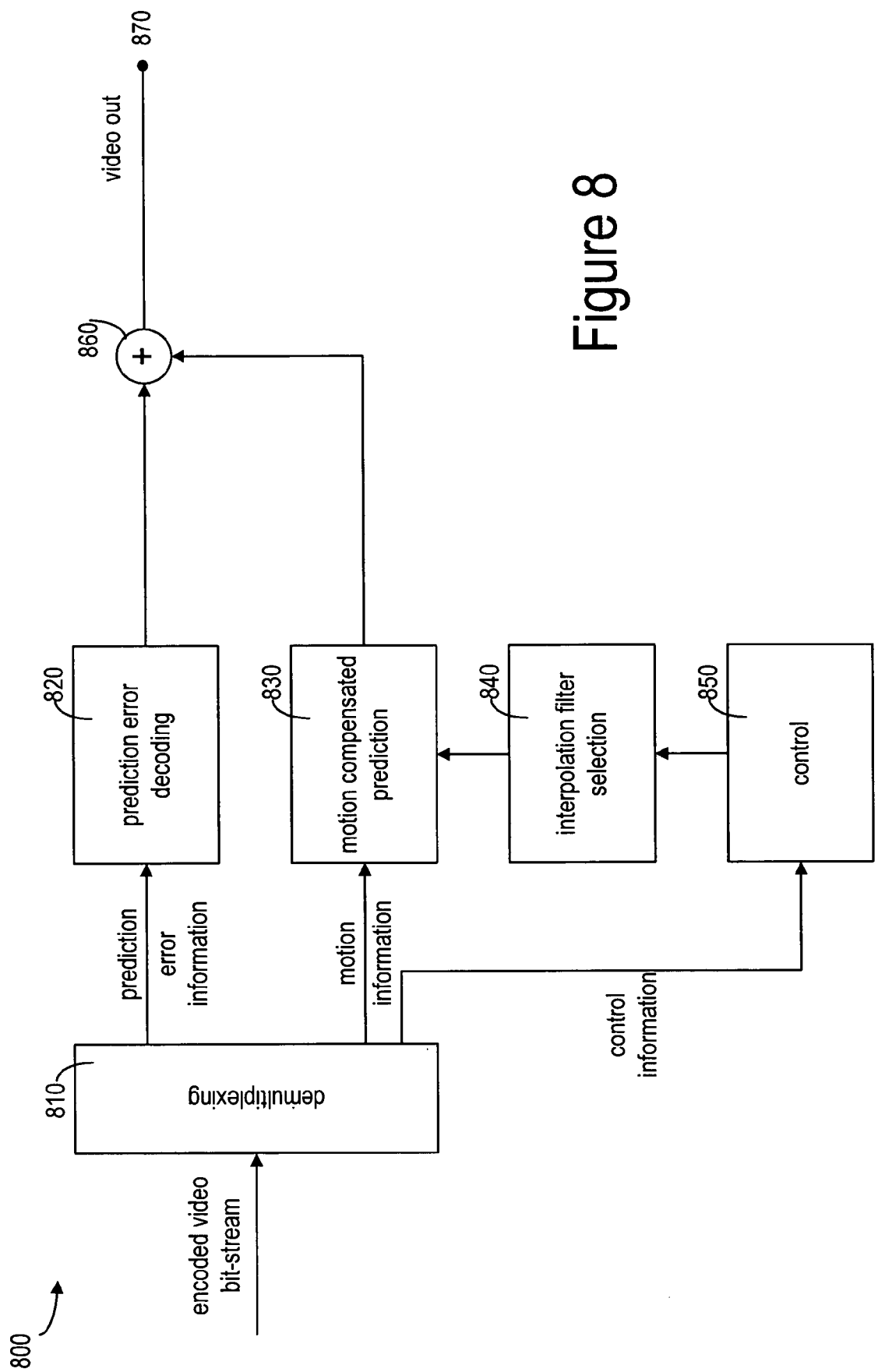

METHOD AND SYSTEM FOR SELECTING INTERPOLATION FILTER TYPE IN VIDEO CODING

This application is based on and claims priority to U.S. provisional application Ser. No. 60/395,111, filed Jul. 9, 2002.

FIELD OF THE INVENTION

The present invention relates generally to image coding and, more particularly, to a system for compression of sequences of digital images.

BACKGROUND OF THE INVENTION

Typical video codecs are based on motion compensated prediction and prediction error coding. Motion compensated prediction is obtained by analyzing and coding motion between video frames and reconstructing image segments using the motion information. Prediction error coding is used to code the difference between motion compensated image segments and corresponding segments in the original image. The accuracy of prediction error coding can be adjusted depending on the available bandwidth and the required quality of the coded video. In a typical Discrete Cosine Transform (DCT) based system this is done by varying the quantizer parameter (QP) used in quantizing the DCT coefficients to a specific accuracy.

Coding systems, in general, provide a set of parameters to represent the coded signals. These parameters are entropy coded and sent to a decoder for decoding and reconstruction of the coded signal. To improve the compression performance of the entropy coder, the parameters are often predicted from the information available for both encoder and decoder. By doing this, the entropy coder needs to code only small variance differences between the actual parameter values and the predicted ones, leading to a coding gain.

A digital image is usually represented by equally spaced samples arranged in the form of an N×M array as shown below, where each element of the array is a discrete quantity. Elements F(x, y) of this array are referred to as image elements, picture elements, pixels or pels. Coordinates (x, y) denote the location of the pixels within the image and pixel values F(x, y) are only given for integer values of x and y.

$$\begin{bmatrix} F(0,0) & F(0,1) & \cdots & F(0,M-1) \\ F(1,0) & F(1,1) & \cdots & F(1,M-1) \\ \vdots & \vdots & \ddots & \vdots \\ F(N-1,0) & F(N-1,1) & \cdots & F(N-1,M-1) \end{bmatrix}$$

A typical video coder employs three types of pictures: intra pictures (I-pictures), predicted pictures (P-pictures) and bi-directionally predicted or bi-predicted pictures (B-pictures). FIG. 1a shows a typical example of a video sequence consisting of an I-picture and a P-picture. I-pictures are independently decodable in the sense that the blocks in an I-picture (I-blocks) do not depend on any reference pictures. A P-picture can depend on available reference pictures such that a block in a P-picture can be either an I-block, or a P-block that depends on one reference picture. FIG. 1b shows a typical example of a video sequence consisting of an I-picture, a B-picture and a P-picture. A B-picture can depend on temporally preceding and following pictures. A block in a B-picture can be an I-block, a P-block or a B-block that depends on two reference pictures.

P-pictures exploit temporal redundancies between the successive frames in the video sequence. When a picture of the original video sequence is encoded as a P-picture, it is partitioned into rectangular regions (blocks), which are predicted from one of the previously coded and transmitted frames $F_{ref}$, called a reference picture. The prediction information of a block is represented by a two-dimensional motion vector ($\Delta x$, $\Delta y$) where $\Delta x$ is the horizontal and $\Delta y$ is the vertical displacement. The motion vectors, together with the reference picture, are used during motion compensation to construct samples in prediction picture $F_{pred}$:

$$F_{pred}(x,y) = F_{ref}(x+\Delta x, y+\Delta y)$$

The motion vectors are found during the motion estimation process. The prediction error, i.e., the difference between the original picture and the prediction picture $F_{pred}$, is compressed by representing its values as a set of weighted basis functions of some discrete transform. The transform is typically performed on an 8×8 or 4×4 block basis. The weights, which are the transform coefficients, are subsequently quantized. Quantization introduces a loss of information since the quantized coefficients have lower precision than the original ones.

The quantized transform coefficients, together with motion vectors and some control information, form a complete coded P-picture representation. These different forms of information are known collectively as syntax elements. Prior to transmission from the encoder to the decoder, all syntax elements are entropy coded, which further reduces the number of bits needed for their representation. Entropy coding is a loss-less operation aimed at minimizing the number of bits required to represent transmitted or stored symbols by utilizing properties of their distribution (some symbols occur more frequently than others).

In the decoder, a P-picture is obtained by first constructing the prediction picture in the same manner as in the encoder and by adding to the prediction picture the compressed prediction error. The compressed prediction error is found by weighting the transform basis functions using the quantized transform coefficients. The difference between the reconstructed picture $F_{rec}$ and the original picture is called the reconstruction error.

Since motion vectors ($\Delta x$, $\Delta y$) can have non-integer values, motion compensated prediction requires evaluating picture values of the reference picture $F_{ref}$ at non-integer locations (x', y')=(x+$\Delta x$, y+$\Delta y$). A picture value at a non-integer location is referred to as a sub-pixel value and the process of determining such a value is called interpolation. Calculation of a sub-pixel value F(x,y) is done by filtering surrounding pixels:

$$F(x', y') = \sum_{k=-K+1}^{K} \sum_{l=-L+1}^{L} f(k, l) F(n+k, m+l),$$

where f(k,l) are filter coefficients and n and m are obtained by truncating x' and y', respectively, to integer values. The filter coefficients are typically dependent on the x' and y' values. The interpolation filters employed are usually separable, in which case sub-pixel value F(x', y') can be calculated as follows:

$$F(x', y') = \sum_{k=-K+1}^{K} f(k) \sum_{l=-L+1}^{L} f(l)F(n+k, m+l).$$

In the case of B-pictures, it is possible to predict one block from two different reference pictures. For each block there can be two sets of motion vectors ($\Delta x_1$, $\Delta y_1$) and ($\Delta x_2$, $\Delta y_2$), one for each reference picture used. The prediction is a combination of pixel values from those two pictures. Typically, pixel values of the two reference pictures are averaged:

$$F_{pred}(x,y)=(F_1(x+\Delta x_1, y+\Delta y_1)+F_2(x+\Delta x_2, y+\Delta y_2))/2$$

Interpolation of pixels in non-integer positions is performed by applying a filter on the neighboring pixel values. Usually, higher order filters produce better results. When multi-picture prediction is used (in B-pictures, for example), interpolation has to be performed for each picture from which pixels are fetched. Therefore, prediction from two reference pictures requires twice the number of interpolations compared with prediction from only one picture. Thus, the complexity of multi-picture prediction is significantly higher than that of single picture prediction.

In the image coding system of the present invention, all the motion information that is used for motion compensation is similar to that specified in existing video coding standards such as H.263 and H.264. For example, according to the draft version of the H.264 video coding standard presented in the document by T. Wiegand: "Joint Committee Draft (CD) of Joint Video Specification (ITU-T rec. H.264 ISO/IEC 14496-10 AVC", Doc. VT-C167, Joint Video Team (JVT) of ISO/IEC MPEG and ITU-T VCEG, May 2002, all P-blocks are predicted using combinations of a 6-tap interpolation filter with coefficients (1, −5, 20, 20, −5, 1)/32 and a bilinear filter. This filtering scheme will now be described in conjunction with FIG. 2. In the figure, the positions labeled "A" represent reference picture samples at integer positions. Other symbols represent interpolated values at fractional sample positions.

According to the H.264 video coding standard, sub-pixel value interpolation can be applied to both the luminance (luma) and chrominance (chroma) components of a picture. However, for simplicity, only interpolation of sub-pixel values in the luminance component will be described here. Depending on the complexity and resolution requirements of the motion compensation process, sub-pixel value prediction in the luminance component can be carried out at quarter sample resolution or one-eighth sample resolution. Again, for simplicity, only quarter sample interpolation will be described below, but it should be appreciated that the exact details of the sub-pixel value interpolation process and the resolution of the interpolation does not affect the applicability of the method according to the present invention.

According to the quarter sample resolution sub-pixel value interpolation procedure defined according to H.264, prediction values at quarter sample positions are generated by averaging samples at integer and half sample positions. The process for each position is described below, with reference to FIG. 2.

The samples at half sample positions labeled '$b^h$' are obtained by first calculating an intermediate value b by applying the 6-tap filter (described above) to the nearest samples 'A' at integer positions in the horizontal direction. The final value of '$b^h$' is calculated according to:

$$b^h = \text{clip1}((b+16)>>5)$$

where x>>n denotes the arithmetic right shift of a two's complement integer representation of x by n binary digits and the mathematical function 'clip 1' is defined as follows:

$$\text{clip1}(c) = \text{clip3}(0, 255, c)$$

$$\text{clip3}(a, b, c) = a \text{ if } c < a$$
$$= b \text{ if } c > b, \text{ or}$$
$$= c \text{ otherwise.}$$

The samples at half sample positions labeled '$b^v$' are obtained equivalently with the filter applied in the vertical direction.

The samples at half sample positions labeled '$c^m$' are obtained by applying the 6-tap filter to the intermediate values b of the closest half sample positions in either the vertical or horizontal direction to form an intermediate result c. The final value is calculated using the relationship $$c^m = \text{clip1}((c+512)>>10).$$

The samples at quarter sample positions labeled 'd', 'g', 'e' and 'f' are obtained by averaging with truncation the two nearest samples at integer or half sample position, as follows:

$$d=(A+b^h)>>1$$

$$g=(b^v+c)>>1$$

$$e=(A+b^v)>>1$$

$$f=(b^h+c^m)>>1.$$

The samples at quarter sample positions labeled 'h' are obtained by averaging with truncation the closest '$b^h$' and '$b^v$' samples in a diagonal direction using the relationship $$h=(b^h+b^v)>>1.$$

The samples at quarter sample positions labeled 'i' are computed using the four nearest samples at integer positions using the relationship $$i=(A_1+A_2+A_3+A_4+2)>>2.$$

In existing video coding standards, such as MPEG-1, MPEG-2, MPEG-3, H.263 and H.264, the same interpolation filter is applied regardless of the type of prediction. It has been found that application of the interpolation filter in this manner is not always efficient. It is advantageous and desirable to provide a method and system for digital image coding which reduces the complexity in picture prediction.

SUMMARY OF THE INVENTION

According to a first aspect of the invention, there is provided a method of encoding a video sequence comprising a number of pictures, in which a picture of the video sequence is divided into blocks and a block of the picture is encoded using one of a number of different types of motion compensated prediction, including at least a single-picture prediction type that employs motion compensated prediction to generate predicted pixel values for the block by using an interpolation filter operating on pixel values of a single reference picture in the video sequence and a multi-picture prediction type that employs motion compensated prediction to generate predicted pixel values for the block by using an interpolation filter operating on pixel values of more than one reference picture in the video sequence. The method is characterized in that the complexity of the interpolation filter used to generate predicted pixel values for the block is dependent upon a characteristic of the block.

The complexity of the interpolation filter is dependent upon the type of motion compensated prediction used in encoding the block.

The complexity of the interpolation filter can be changed by changing the type of the filter.

The complexity of the interpolation filter can be reduced when using said multi-picture prediction type to generate predicted pixel values for the block.

The complexity of the interpolation filter can be reduced when using said multi-picture prediction type by using a shorter filter, or using said multi-picture prediction type by using a filter having fewer coefficients.

The complexity of the interpolation filter can be changed dependent upon the size of the block, or the shape of the block.

Preferably, the interpolation filter operating on pixel values of more than one reference picture is shorter than the interpolation filter operating on pixel values of a single reference picture.

Advantageously, the interpolation filter operating on pixel values of more than one reference picture comprises a 4-tap filter and the interpolation filter operating on pixel values of a single reference picture comprises a 6-tap filter.

Advantageously, the interpolation filter operating on pixel values of more than one reference picture is dependent on a fractional pixel position in calculating a sub-pixel value.

Advantageously, the method also comprises defining a set of interpolation filters for use in connection with a particular prediction type, and providing an indication of a particular one of said set of interpolation filters to be used in motion compensated prediction of a block.

According to the second aspect of the invention, there is provided a coding system for coding a video sequence, the video sequence comprising a number of pictures, in which a picture of the video sequence is divided into blocks and a block of said picture is encoded using one of a number of different types of motion compensated prediction, including at least a single-picture prediction type that employs motion compensated prediction to generate predicted pixel values for the block by using an interpolation filter operating on pixel values of a single reference picture in said video sequence and a multi-picture prediction type that employs motion compensated prediction to generate predicted pixel values for the block by using an interpolation filter operating on pixel values of more than one reference picture in said video sequence, The system comprises:

means for selecting a prediction type to be used in motion compensated prediction encoding of the block; and means for changing the interpolation filter based on the selected prediction type.

The changing means also changes the interpolation filter based on a characteristic of the block, the size of the block, or the shape of the block.

According to the third aspect of the present invention, there is provided a method of motion compensated prediction for use in a video coding system, in which system a video sequence comprising a number of pictures, in which a picture of the video sequence is divided into blocks and a block of said picture is encoded using one of a number of different types of motion compensated prediction, including at least a single-picture prediction type that employs motion compensated prediction to generate predicted pixel values for the block by using an interpolation filter operating on pixel values of a single reference picture in said video sequence and a multi-picture prediction type that employs motion compensated prediction to generate predicted pixel values for the block by using an interpolation filter operating on pixel values of more than one reference picture in said video sequence. The method comprises:

determining the types of the motion compensated prediction; and changing the interpolation filter based on the determined types of the motion compensated prediction.

According to the fourth aspect of the present invention, there is provided a method of motion compensated prediction in which an interpolation filter to be used during motion compensated prediction of a picture block is selected in dependence on the type of motion compensated prediction used.

The method can be implemented in a video encoder, or a video decoder.

If the type of motion compensation used is a multi-picture prediction type, in which a prediction for the picture block is formed using more than one reference picture, the selected interpolation filter has fewer coefficients than the interpolation filter that is selected when the type of motion compensated prediction used is a single-picture prediction type, in which a prediction for the picture block is formed using a single reference picture.

The interpolation filter is selected in dependence on a characteristic of the picture block, the size of the picture block, or the shape of the picture block.

According to the fifth aspect of the present invention, there is provided an apparatus for performing motion compensated prediction comprising means for selecting an interpolation filter to be used during motion compensated prediction of a picture block in dependence on the type of motion compensated prediction used.

The apparatus can be implemented in a video encoder, or in a video decoder.

If the type of motion compensation used is a multi-picture prediction type, in which a prediction for the picture block is formed using more than one reference picture, said means for selecting an interpolation filter is operative to select an interpolation filter that has fewer coefficients than an interpolation filter that is selected when the type of motion compensated prediction used is a single-picture prediction type, in which a prediction for the picture block is formed using a single reference picture.

The means for selecting an interpolation filter is operative to select an interpolation filter in dependence on a characteristic of a picture block.

The means for selecting an interpolation filter is operative to select an interpolation filter in dependence on the size of the picture block.

According to the sixth aspect of the present invention, there is provided a video encoder comprising an apparatus for performing motion compensated prediction, wherein said apparatus for performing motion compensated prediction comprises means for selecting an interpolation filter to be used during motion compensated prediction of a picture block in dependence on the type of motion compensated prediction used.

According to the seventh aspect of the present invention, there is provided a video decoder comprising an apparatus for performing motion compensated prediction, wherein said apparatus for performing motion compensated prediction comprises means for selecting an interpolation filter to be used during motion compensated prediction of a picture block in dependence on the type of motion compensated prediction used.

In a preferred embodiment of the present invention, different motion interpolation filters are used for different prediction types. The filter type is changed at the block level depending on the type of block prediction.

More specifically, the present invention uses shorter filters when multi-picture prediction is used. This approach significantly lowers the complexity required in the motion interpolation process. At the same time, when the shorter filters are selected appropriately, the effect on the quality of the interpolation is negligible due to the additional filtering effect provided by the weighting of the two predictions.

The present invention will become apparent upon reading the description taken in conjunction with FIGS. 3 to 8.

BRIEF DESCRIPTION OF THE DRAWINGS

FIG. 1a is a schematic representation illustrating two P-blocks in a P-picture being predicted from previous picture data.

FIG. 1b is a schematic representation illustrating two B-blocks in a B-picture being predicted from two reference pictures.

FIG. 2 is a schematic representation illustrating integer samples and fractional sample positions for quarter sample luma interpolation according to prior art.

FIG. 8 is a block diagram illustrating a video decoder according to a preferred embodiment of the invention, in which interpolation filters are selected in dependence on the type of motion compensated prediction.

DETAILED DESCRIPTION OF THE INVENTION

According to a preferred embodiment of the invention, shorter interpolation filters are used for bi-directionally predicted B-blocks in order to reduce the interpolation complexity. For example, in a particular embodiment, the following 4-tap filters are used to obtain values for the sub-pixels located at different fractional pixel positions:

0/4:(0, 16, 0, 0)/16

1/4:(−2, 14, 5, −1)/16

2/4:(−2, 10, 10, −2)/16

3/4:(−1, 5, 14, −2)/16

Figure 3:
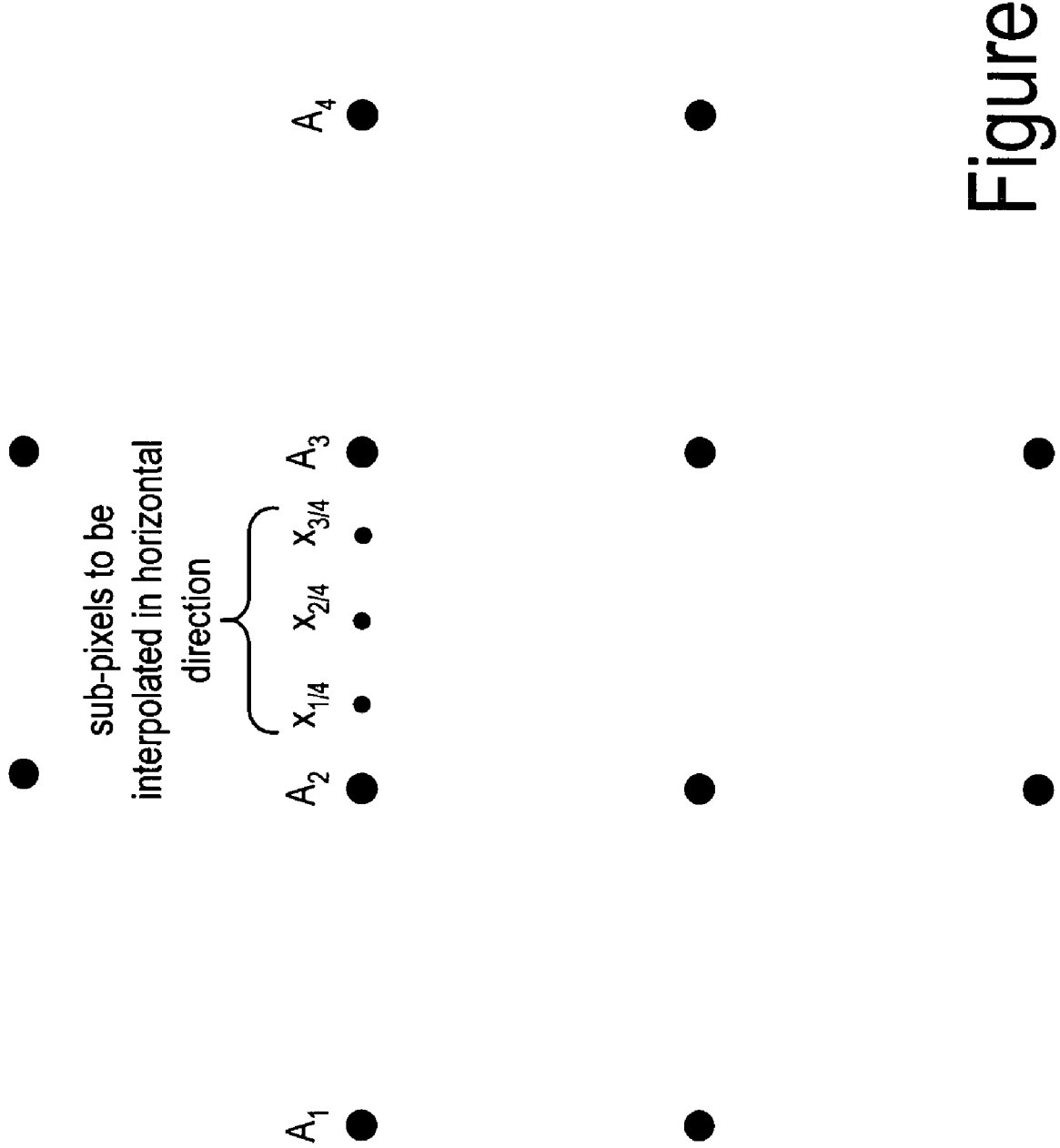
FIG. 3 is a schematic representation illustrating sub-pixel value interpolation in the horizontal direction.
Figure 4:
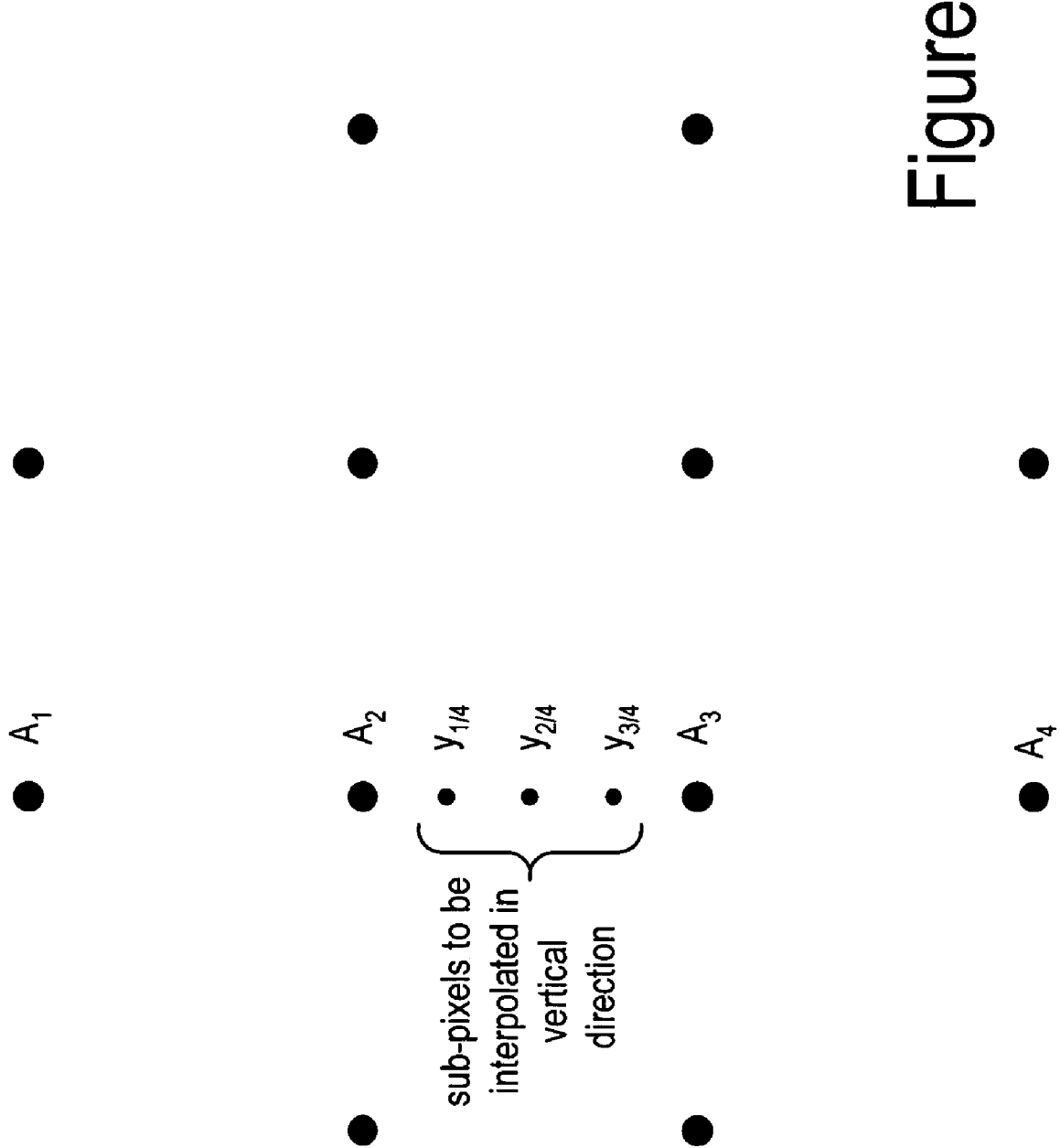
FIG. 4 is a schematic representation illustrating sub-pixel value interpolation in the vertical direction.

Use of the interpolation filters defined above in the calculation of sub-pixel values will now be described in detail with reference to FIGS. 3 and 4. Both figures show a small array of pixels representing part of an image block where interpolation is to be performed. FIG. 3 illustrates use of the previously defined interpolation filters in the horizontal direction, while FIG. 4 illustrates application of the filters in the vertical direction. In both Figures, the values of pixels located at integer pixel locations and used by the interpolation filter are denoted by the symbol 'A', following the convention introduced in FIG. 2. In addition, each pixel is provided with a numerical subscript (i.e. $A_1$, $A_2$, $A_3$, $A_4$), indicating the interpolation filter coefficient by which the particular pixel value is to be multiplied. In FIG. 3, the sub-pixel values to be interpolated in the horizontal row including pixels $A_1$, $A_2$, $A_3$ and $A_4$ are denoted by $x_{1/4}$, $x_{2/4}$ and $x_{3/4}$, respectively. Similarly, in FIG. 4, the sub-pixel values to be interpolated in the vertical column including pixels $A_1$, $A_2$, $A_3$ and $A_4$ are denoted by $y_{1/4}$, $y_{2/4}$ and $y_{3/4}$.

Now considering FIG. 3 in detail, sub-pixel value $x_{1/4}$ is calculated by applying interpolation filter (1/4), defined above, to pixel values $A_1$, $A_2$, $A_3$ and $A_4$. Thus, $x_{1/4}$ is given by:

$$x_{1/4}=((-2 \cdot A_1)+(14 \cdot A_2)+(5 \cdot A_3)+(-1 \cdot A_4))/16$$

Sub-pixel $x_{2/4}$ is calculated in an analogous manner by applying interpolation filter (2/4) to pixel values $A_1$, $A_2$, $A_3$ and $A_4$ and similarly, sub-pixel $X_{3/4}$ is calculated by applying interpolation filter (3/4), as shown below:

$$x_{2/4}=((-2 \cdot A_1)+(10 \cdot A_2)+(10 \cdot A_3)+(-2 \cdot A_4))/16$$

$$x_{3/4}=((-1 \cdot A_1)+(5 \cdot A_2)+(14 \cdot A_3)+(-2 \cdot A_4))/16$$

Now referring to FIG. 4, sub-pixel value interpolation in the vertical direction is performed in a manner exactly analogous to that just described in connection with horizontal interpolation. Thus, sub-pixel values $y_{1/4}$, $y_{2/4}$ and $y_{3/4}$ are calculated using respectively interpolation filters (1/4), (2/4) and (3/4) applied to the integer location pixel values $A_1$, $A_2$, $A_3$ and $A_4$ as defined in FIG. 4. More specifically, then:

$$y_{1/4}=((-2 \cdot A_1)+(14 \cdot A_2)+(5 \cdot A_3)+(-1 \cdot A_4))/16$$

$$y_{2/4}=((-2 \cdot A_1)+(10 \cdot A_2)+(10 \cdot A_3)+(-2 \cdot A_4))/16$$

$$y_{3/4}=((-1 \cdot A_1)+(5 \cdot A_2)+(14 \cdot A_3)+(-2 \cdot A_4))/16$$

Figure 5:
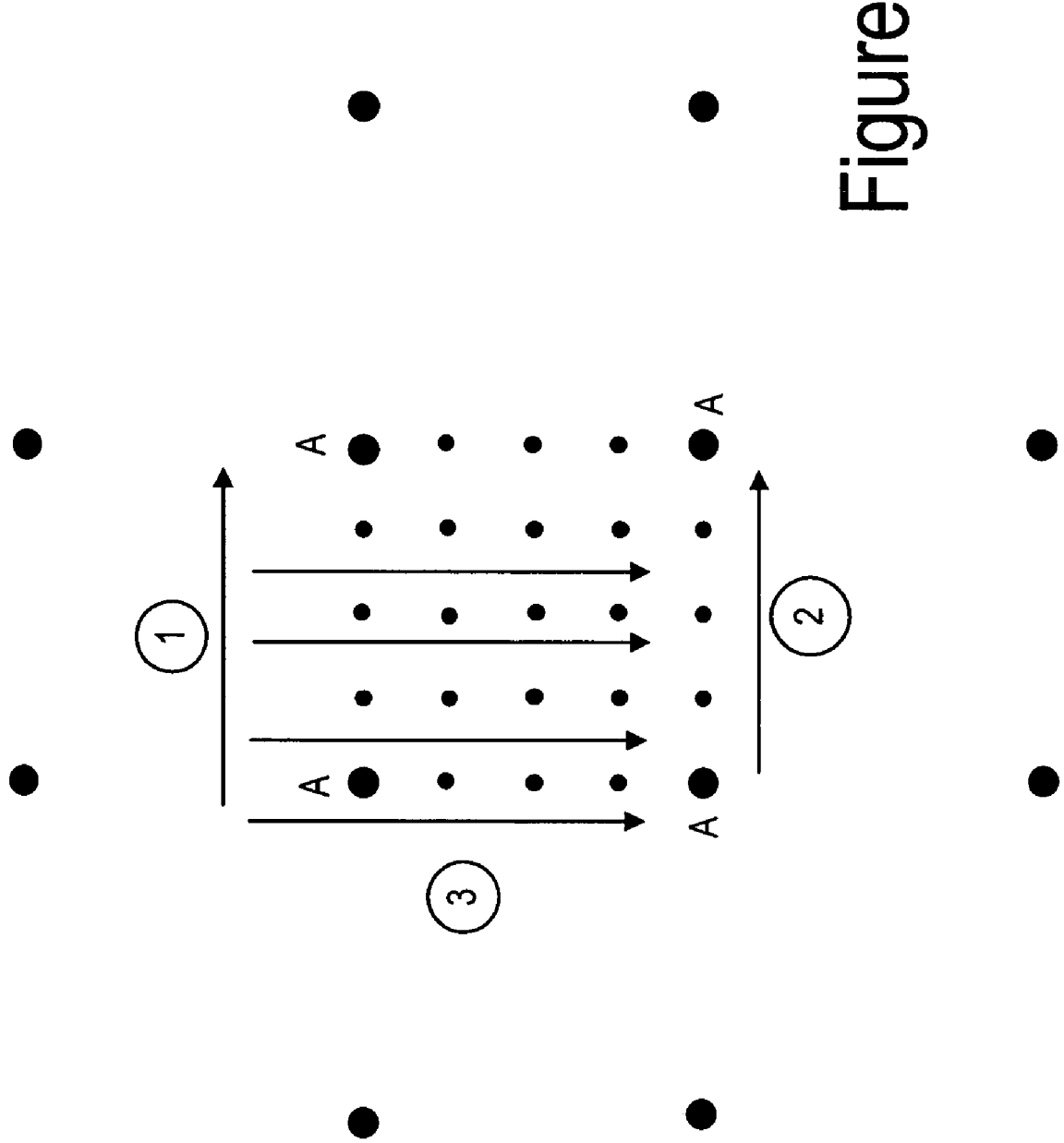
FIG. 5 is a schematic representation illustrating a process for construction of a two-dimensional array of sub-pixel values by interpolation in both horizontal and vertical directions.

Interpolation filter (0/4) is included in the set of interpolation filters for completeness and is purely notional as it represents the calculation of a sub-pixel value co-incident with, and having the same value as, a pixel at an integer location. The coefficients of the other 4-tap interpolation filters (1/4), (2/4) and (3/4) are chosen empirically for example, so as to provide the best possible subjective interpolation of the sub-pixel values. By first interpolating rows of sub-pixel values in the horizontal direction (as illustrated by steps 1 and 2 in FIG. 5) and then interpolating column-by-column in the vertical direction (step 3 in FIG. 5), a value for each sub-pixel position between integer location pixels can be obtained.

Figure 6:
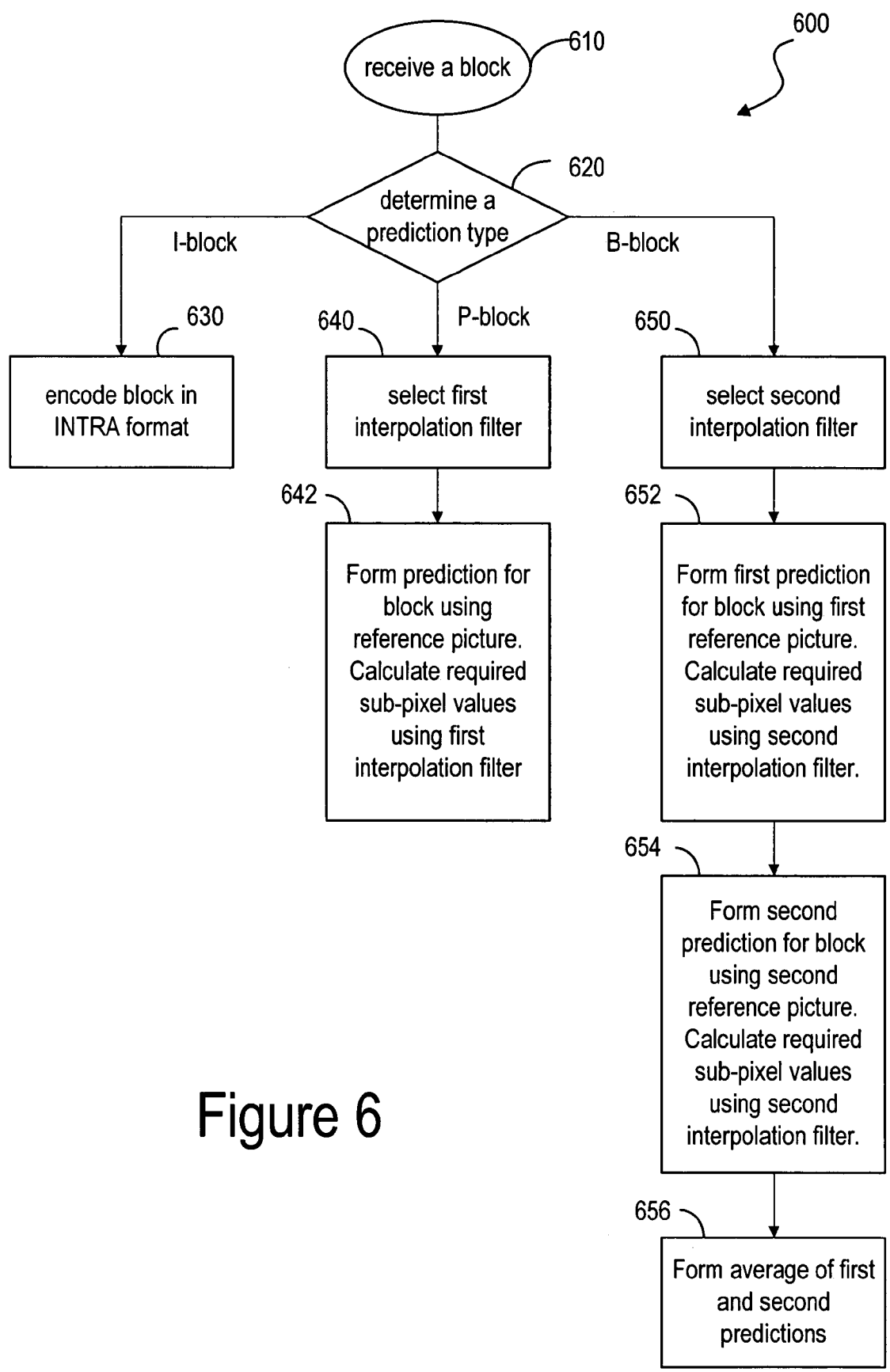
FIG. 6 is a flowchart illustrating the method of filter selection, according to the present invention.

FIG. 6 is a flowchart illustrating the method of sub-pixel value prediction, according to the preferred embodiment of the present invention. As shown in flowchart 600 of FIG. 6, when a video encoder implemented according to the preferred embodiment of the invention receives a block of a video picture for encoding (step 610), it determines, at step 620, the prediction type to be used in encoding of the block. If the encoder determines that block is to be encoded as an I-block i.e. motion compensated prediction is not to be used, the block is encoded in INTRA format (step 630).

If the block is to be encoded as a P-block, it is encoded using motion compensated prediction with respect to a single reference picture (i.e. a previously encoded picture in the video sequence). The video encoder selects a first interpolation filter to be used in calculation of any sub-pixel values required during the motion compensation process (step 640) and then forms a prediction for the block using the reference picture, calculating any sub-pixel values as required using the selected (first) interpolation filter (step 642). If the video encoder is implemented according to ITU-T video coding recommendation H.264, for example, the process by which sub-pixel values are determined for P-blocks is advantageously identical to that proposed in the H.264 standard.

If the block is to be encoded as a B-block using bi-directional prediction from two reference pictures, the video encoder selects a second interpolation filter, different from the first filter, to be used in the calculation of sub-pixel values (step 650). In the preferred embodiment of the invention, the second filter has a length (number of coefficients) that is less than the length (number of coefficients) of the first filter. When encoding the bi-directionally predicted B-block, the video encoder forms two separate predictions for the block, one from each of the reference pictures (steps 652 and 654), and uses the second interpolation filter to calculate sub-pixel values as required. It then forms an average of the two predictions and uses this as the final prediction for the block (step 656). As the second interpolation filter has a number of coefficients that is less than the number of coefficients of the first interpolation filter, using the second interpolation filter to generate sub-pixel values in bi-directional B-block prediction significantly reduces the complexity of the interpolation process compared with the complexity if the first interpolation filter were used. More specifically, in the situation where, for example, the first prediction filter is a 6-tap filter (i.e. it has six coefficients) and the second interpolation filter is a 4-tap filter (4 coefficients), bi-directional B-block interpolation involves two filtering operations on 4×4 arrays of pixels (one for each prediction that is formed) instead of two filtering operations performed on 6×6 arrays of pixels. As two 4×4 filtering operations take place instead of two 6×6 filtering operations, the complexity of the B-picture coding is significantly reduced while the interpolation accuracy is only minimally affected.

Figure 7:
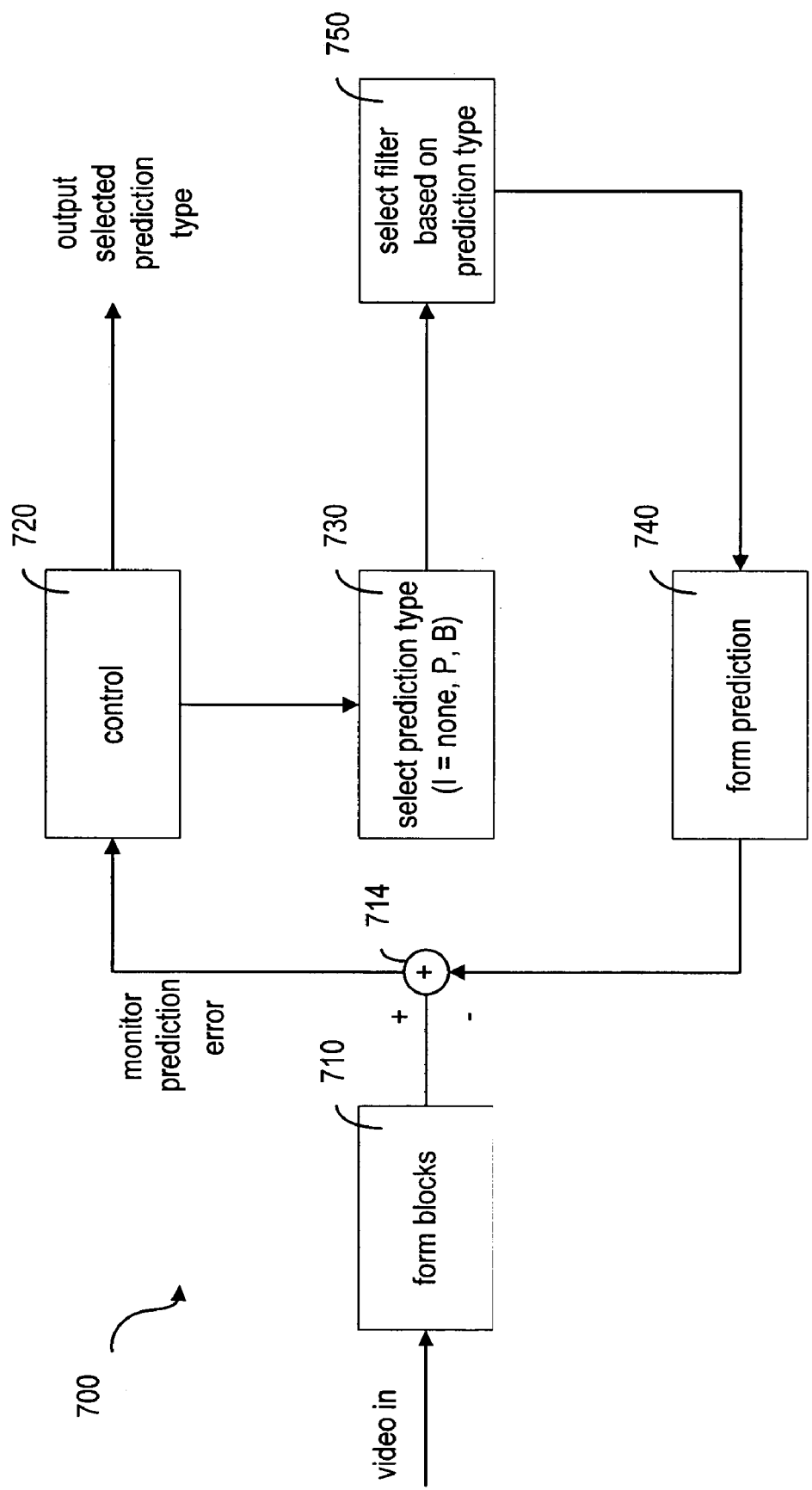
FIG. 7 is a block diagram illustrating a video encoder according to a preferred embodiment of the invention, in which interpolation filters are selected in dependence on the type of motion compensated prediction.

FIG. 7 is a block diagram showing a video encoder capable of carrying out the method of selecting an interpolation filter type, according to the present invention. As shown in the Figure, encoder 700 includes a forming block 710, a subtractor 714, a control block 720, a prediction type selection block 730, an interpolation filter selection block 750 and a prediction block 740.

Forming block 710 receives a video input signal comprising a sequence of video pictures to be coded and divides each received picture into blocks, each block having a predetermined size and shape.

Control block 720 is operative to determine an optimum prediction type for each block. Although the choice of a prediction type can be performed in a number of different ways, according to an embodiment of the invention, control block 720 is arranged to examine each available prediction type in turn and to make a decision about the prediction type to be selected for a particular block based on a measure that takes into account both the degree of image distortion introduced by using a given prediction type and the amount of information needed to code the block using that prediction type. This kind of measure is commonly referred to as a 'cost function'. In alternative embodiments of the invention other equivalent measures may be used.

In the embodiment of the invention considered here, the available prediction types are (a) no prediction, in which case the image block is coded in INTRA format, (b) P-block prediction, in which a prediction for the block is formed using a single reference frame and (c) B-block prediction, in which case bi-directional prediction from two reference frames is used. Control block 720 selects each prediction type in turn by instructing prediction type selection block 730 to set the encoder into a particular coding mode (I-block, P-block or B-block). Control block 720 calculates the value of the cost function that results from using each prediction type and chooses a selected prediction type for the block and an associated interpolation filter type to be used in prediction of the block in accordance with the coding mode (I, P or B) which yields the lowest cost function.

Formation of the various predictions for a particular block and choice of the selected prediction type will now be described in greater detail. In the embodiment of the invention described here, in which there are three available prediction types, control block 720 first instructs prediction type selection block 730 to set the video encoder into P-block coding mode, in which a prediction for the block is formed using a single reference frame. Prediction type selection block 730, in turn, instructs interpolation filter selection block 750 to select an interpolation filter for calculating sub-pixel values during the P-block prediction process. A prediction for the block is then formed in prediction block 740 using the selected prediction type and interpolation filter. Next, a measure of prediction error is formed in subtractor 714. This is done by comparing the prediction for the block, just formed, with the image data for the block input from forming block 710. Control block 720 receives the measure of prediction error from subtractor 714 and calculates the cost function value that results from using the currently selected prediction type (P-block prediction). As previously explained, the cost function takes into account the size of the prediction error and the amount of data required to represent the prediction for the block and the prediction error (that is effectively the amount of data required to transmit information necessary to reconstruct the block at a corresponding video decoder). Control block 720 then stores the cost function value in a memory of the video encoder (not shown in FIG. 7).

Control block 720 next instructs prediction type selection block 730 to set the video encoder into B-block coding mode. In this mode, a prediction for the block is formed by using bi-directional prediction from two reference frames. Prediction type selection block 730 instructs interpolation filter selection block 750 to select an interpolation filter for use during the B-block prediction process and prediction block 740 forms a prediction for the block using the selected prediction type and interpolation filter. Advantageously, according to the invention, the interpolation filter selected in B-block coding mode is different from that selected for use in P-block prediction. More specifically, the interpolation filter selected for B-block prediction has fewer coefficients than the interpolation filter used in P-block prediction. Once a prediction for the block has been produced in prediction block 740, a prediction error is formed by subtractor 714 and passed to control block 720 where a corresponding cost function value is calculated and stored in the video encoder's memory.

Finally, control block 720 instructs prediction type selection block 730 to set the video encoder into I-block (INTRA) coding mode. In this mode, no prediction is used and therefore no interpolation filter is required. Prediction type selection block 730 instructs interpolation filter selection block 750 appropriately and the video encoder proceeds to encode the block in INTRA format. Control block 720 then calculates a corresponding cost function value and stores it in the memory of the video encoder.

At this point control block 720 examines the three cost function values stored in the memory and chooses a selected coding mode for the block according to the prediction type that yields the smallest cost function value. Based on this choice, control block 720 outputs the selected prediction type. In a preferred embodiment of the invention, it is not necessary to provide an indication of the selected interpolation filter as this is determined explicitly by the choice of prediction type. In other words, when receiving the encoded information representative of a particular block, a video decoder implemented according to the invention can decode and determine the prediction type of the block and thereby directly infer the interpolation to be used during motion compensated prediction at the decoder. In an alternative embodiment of the invention, a specific indication of the interpolation filter to be used may be provided by control block 720 and included in the encoded information representative of the block.

FIG. 8 is a diagram showing a video decoder 800 implemented according to a preferred embodiment of the present invention. As can be seen from the figure, the decoder comprises a demultiplexing block 810, a prediction error decoding block, a motion compensated prediction block 830, an interpolation filter selection block 840, a control block 850, an adder 860 and a video output 870. The decoder is arranged to receive and decode an encoded video bit-stream produced by the previously described video encoder 700.

Among other things, the encoded bit-stream comprises encoded motion information, prediction error information and control information relating to encoded blocks. The encoded video bit-stream is received by demultiplexer 810 and is split into its constituent parts. Control information relating to the type of motion compensated prediction used in the encoder to encode a given block is extracted from the bit-stream by demultiplexer 810 and is passed to control block 850. Any motion information pertaining to the block is passed to motion compensated prediction block 830 and associated prediction error information is forwarded to prediction error decoding block 820.

If, on the basis of the control information, control block 850 determines that the block in question was encoded as an I-block i.e. without the use of motion compensated prediction, it switches video decoder 800 into an INTRA decoding mode, which then decodes the block accordingly. If, on the other hand, the control information indicates that the block was encoded as either a P-block or a bi-directional B-block, control block 850 instructs interpolation filter selection block 840 to select an interpolation filter appropriate for the type of motion compensated prediction and then causes motion compensated prediction block 830 to decode the block using the corresponding motion information extracted from the video bit-stream by demultiplexer 810. During decoding of the block, motion compensated prediction block 830 forms a prediction (predicted pixel values) for the block using one or more reference frames (one in the case of a P-block, two in the case of a bi-directional B-block), constructing sub-pixel values as required using the selected interpolation filter. The predicted pixel values for the block are then passed to adder 860 where they are combined with decoded prediction error information formed by prediction error decoding block 820 to a form fully reconstructed block of pixel values. This is then output for display or storage via video output 870.

Implementation Alternatives

The present invention can be implemented in various ways:

Different interpolation filters can be selected instead of the ones described above i.e. different lengths and/or filter coefficient values can be used.

In addition to the prediction mode of the block, the interpolation filter can also depend on other characteristics of the block (i.e., size, shape or luminance information). For example, in one alternative embodiment of the invention, a 6-tap filter is used for blocks that have dimensions of 8×8 pixels and a 4-tap filter is used for blocks having dimensions of 4×4 pixels. In another alternative embodiment a rectangular rather than a square block is used, (for example 8 pixels in the horizontal dimension and 4 pixels in the vertical dimension) a longer filter being used for interpolation of sub-pixel values in the horizontal dimension (e.g. a 6-tap filter) and a shorter filter being used for interpolation of sub-pixel values in the vertical dimension (e.g. a 4-tap filter). In further alternative embodiments, different interpolation filters can be used for the luminance and chrominance components of the image information. The human visual system has different sensitivities to the luminance and chrominance components of an image (it is less sensitive to spatial variations in chrominance information) and therefore it may be appropriate in certain situations to use different types of interpolation filter to operate on the luminance and chrominance components.

The block mode or other characteristics of the block do not have to define the filter explicitly, but this information can be used to define sets of filters, and the most suitable filter can be identified by other means (e.g. by sending selection information). As mentioned above in connection with description of a video encoder according to a preferred embodiment of the invention, in the case where there is one interpolation filter provided per available prediction type, selection of a particular prediction type implies the use of a given interpolation filter. However, in other embodiments of the invention where more than one interpolation filter is defined for each prediction type, information regarding the choice of interpolation filter is provided in the encoded in the video bit-stream and sent to a corresponding decoder in order to enable the decoder to choose the correct interpolation filter for use in motion compensated prediction at the decoder.

The present invention can be applied on any number of reference frames used in prediction of a picture block. It should be noted that, in theory, there is essentially no restriction on the number of reference frames that could be used. Obviously, there should be some practical/reasonable limit.

The present invention can be applied on any combination of two or more reference frames used in prediction of a picture block.

Thus, although the invention has been described with respect to a preferred embodiment thereof, it will be understood by those skilled in the art that the foregoing and various other changes, omissions and deviations in the form and detail thereof may be made without departing from the scope of this invention.

What is claimed is:

1. A method of motion compensated prediction, said method comprising:
selecting an interpolation filter to be used during motion compensated prediction of a picture block in dependence on a type of motion compensated prediction used for the picture block, wherein the type of motion compensation prediction is either a single-picture type, in which a prediction for the picture block is formed using a single reference picture, or a multi-picture prediction type, in which a prediction for the picture block is formed using more than one reference picture, and wherein the interpolation filter for the multi-picture prediction type has fewer coefficients than the interpolation filter for the single-picture prediction type.

2. A method according to claim 1, implemented in a video encoder.

3. A method according to claim 1, implemented in a video decoder.

4. A method according to claim 1, further comprising defining a set of interpolation filters for use in connection with a particular prediction type.

5. A method according to claim 4, further comprising providing an indication of a particular one of said set of interpolation filters to be used in motion compensated prediction of a block.

6. An apparatus for performing motion compensated prediction comprising:
means for selecting an interpolation filter to be used during motion compensated prediction of a picture block in dependence on a type of motion compensated prediction used, wherein if the type of motion compensation used is a multi-picture prediction type, in which a prediction for the picture block is formed using more than one reference picture, said means for selecting an interpolation filter is operative to select an interpolation filter that has fewer coefficients than an interpolation filter that is selected when the type of motion compensated prediction used is a single-picture prediction type, in which a prediction for the picture block is formed using a single reference picture.

7. An apparatus according to claim 6, implemented in a video encoder.

8. An apparatus according to claim 6, implemented in a video decoder.

9. A video encoder comprising:
means for performing motion compensated prediction, and means for selecting an interpolation filter to be used during motion compensated prediction of a picture block in dependence on the type of motion compensated prediction used, and wherein if the type of motion compensation used is a multi-picture prediction type, in which a prediction for the picture block is formed using more than one reference picture, said means for selecting an interpolation filter is operative to select an interpolation filter that has fewer coefficients than an interpolation filter that is selected when the type of motion compensated prediction used is a single-picture prediction type, in which a prediction for the picture block is formed using a single reference picture.

10. A video decoder comprising:
means for performing motion compensated prediction, and
means for selecting an interpolation filter to be used during motion compensated prediction of a picture block in dependence on the type of motion compensated prediction used, and wherein if the type of motion compensation used is a multi-picture prediction type, in which a prediction for the picture block is formed using more than one reference picture, said means for selecting an interpolation filter is operative to select an interpolation filter that has fewer coefficients than an interpolation filter that is selected when the type of motion compensated prediction used is a single-picture prediction type, in which a prediction for the picture block is formed using a single reference.

11. A coding system for coding a video sequence, said system comprising:
a control module for selecting a prediction type to be used in motion compensated prediction encoding of a picture block, wherein the prediction type is either a single-picture prediction type in which a prediction for the picture block is formed using a single-reference picture or a mutli-picture type in which the prediction for the picture block is formed using more than one reference pictures; and
selecting an interpolation filter based on the selected prediction type, wherein the interpolation filter for the mutli-picture type has fewer coefficients than the interpolation filter for the single-picture prediction type.

12. A coding system according to claim 11, wherein the control module is further adapted to change the interpolation filter based on a characteristic of the block.

13. A method of encoding a video sequence, said method comprising:
selecting an interpolation filter for use during motion compensated prediction of a picture block in dependence on a type of motion compensated prediction used, wherein if the type of motion compensation used is a multi-picture prediction type, in which a prediction for the picture block is formed using more than one reference picture, the selected interpolation filter has fewer coefficients than the interpolation filter that is selected when the type of motion compensated prediction used is a single-picture prediction type, in which a prediction for the picture block is formed using a single reference picture.

14. A method according to claim 13, further comprising:
defining a set of interpolation filters for use in connection with a particular prediction type; and
providing an indication of a particular one of said set of interpolation filters to be used in motion compensated prediction of a block.

15. A method according to claim 13, wherein the selection of the interpolation filter further depends upon a size of the motion compensated prediction block.

16. A method according to claim 13, wherein the selection of the interpolation filter further depends upon a shape of the motion compensated prediction block.

17. A method of decoding an encoded video sequence, the method comprising:
selecting an interpolation filter for use during motion compensated prediction of a picture block in dependence on the type of motion compensated prediction used, wherein if the type of motion compensation used is a multi-picture prediction type, in which a prediction for the picture block is formed using more than one reference picture, the selected interpolation filter has fewer coefficients than the interpolation filter that is selected when the type of motion compensated prediction used is a single-picture prediction type, in which a prediction for the picture block is formed using a single reference picture.

18. A method according to claim 17, further comprising:
defining a set of interpolation filters for use in connection with a particular prediction type; and
retrieving from the encoded video sequence an indication of a particular one of said set of interpolation filters to be used in motion compensated prediction of a block.

19. A method according to claim 17, wherein the selection of the interpolation filter further depends upon a size of the motion compensated prediction block.

20. A method according to claim 17, wherein the selection of the interpolation filter further depends upon a shape of the motion compensated prediction block.

21. A video encoder for encoding a video sequence, the encoder comprises:
a control module for selecting an interpolation filter for use during motion compensated prediction of a picture block in dependence on a type of motion compensated prediction used, wherein if the type of motion compensation used is a multi- picture prediction type, in which a prediction for the picture block is formed using more than one reference picture, said means for selecting an interpolation filter is operative to select an interpolation filter that has fewer coefficients than an interpolation filter that is selected when the type of motion compensated prediction used is a single-picture prediction type, in which a prediction for the picture block is formed using a single reference.

22. An encoder according to claim 21, wherein the control module is further configured to define a set of interpolation filters for use in connection with a particular prediction type and, said encoder further comprises:
a multiplexer for providing an indication of a particular one of said set of interpolation filters for use in the motion compensated prediction of the picture block.

23. An encoder according to claim 21, wherein the selection of the interpolation filter further depends upon the size of the motion compensated prediction block.

24. An encoder according to claim 21, wherein the selection of the interpolation filter further depends upon the shape of the motion compensated prediction block.

25. A video decoder for decoding an encoded video sequence, the decoder comprises:
a control module for selecting an interpolation filter for use during motion compensated prediction of a picture block in dependence on a type of motion compensated prediction used, wherein if the type of motion compensation used is a multi-picture prediction type, in which a prediction for the picture block is formed using more than one reference picture, the selected interpolation filter has fewer coefficients than the interpolation filter that is selected when the type of motion compensated prediction used is a single-picture prediction type, in which a prediction for the picture block is formed using a single reference picture.

26. A decoder according to claim 25, wherein the control module is further configured to define a set of interpolation filters for use in connection with a particular prediction type, said decoder further comprising:
a demultiplexer for retrieving from the encoded video sequence an indication of a particular one of said set of interpolation filters to be used in the motion compensated prediction of the picture block.

27. A decoder according to claim 25, wherein the selection of the interpolation filter further depends upon a size of the motion compensated prediction block.

28. A decoder according to claim 25, wherein the selection of the interpolation filter further depends upon a shape of the motion compensated prediction block.

29. A method of encoding a video sequence, the method comprising:
determining a type of motion compensated prediction for a current block, the motion compensated prediction type indicating whether the prediction is derived from one reference block or from more than one reference block; and
selecting an interpolation filter based on the type of motion compensated prediction, wherein the interpolation filter for motion-compensated prediction from more than one reference block has fewer coefficients than the interpolation filter for motion- compensated prediction from one reference block.

30. An encoder for encoding a video sequence, said encoder comprising:
a control module for
determining a type of motion compensated prediction for use in encoding of a current block, the motion compensated prediction type indicating whether the prediction is derived from one reference block or from more than one reference block; and
selecting an interpolation filter based on the type of motion compensated prediction, wherein the interpolation filter for motion-compensated prediction from more than one reference block has fewer coefficients than the interpolation filter for motion-compensated prediction from one reference block.

31. A method of decoding an encoded video sequence, the method comprising:
retrieving an indication of a motion compensated prediction used for a current block from the bitstream;
determining a type of motion compensated prediction for the current block, the motion compensated prediction type indicating whether prediction is derived from one reference block or from more than one reference block; and
selecting an interpolation filter based on the type of motion compensated prediction, wherein the interpolation filter for motion-compensated prediction from more than one reference block has fewer coefficients than the interpolation filter for motion- compensated prediction from one reference block.

32. A decoder for decoding an encoded video sequence, the decoder comprises:
a demultiplexer for
retrieving an indication of a motion compensated prediction used for a current block from the bitstream; and
determining a type of motion compensated prediction for the current block, the motion compensated prediction type indicating whether prediction is derived from one reference block or from more than one reference block; and
a control module for selecting an interpolation filter based on the type of motion compensated prediction, wherein the interpolation filter for motion- compensated prediction from more than one reference block has fewer coefficients than the interpolation filter for motion-compensated prediction from one reference block.

* * * * *